3,165,451
RECOVERY OF AMINO-SUBSTITUTED ALKANE-
THIOLS BY DISTILLATION WITH A SOLVENT
Rector P. Louthan, Bartlesville, Okla., assignor to Phillips
Petroleum Company, a corporation of Delaware
Filed Aug. 27, 1962, Ser. No. 219,776
6 Claims. (Cl. 202—50)

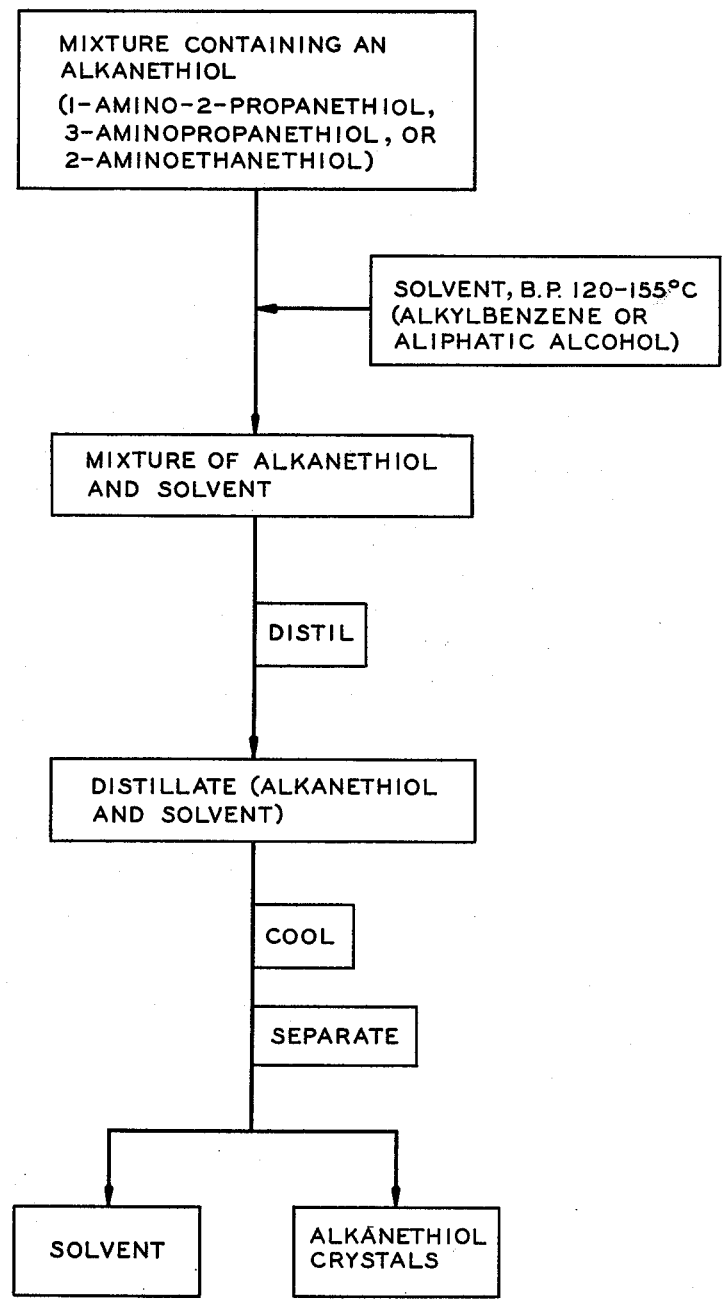

This invention relates to an improved process for the recovery of amino-substituted alkanethiols from materials containing the same. In another aspect, it relates to an improved process for the recovery of 1-amino-2-propanethiol from a reaction mixture containing the compound.

The preparation of various thiols (or mercaptans) by reacting hydrogen sulfide with certain organic compounds containing ethylenic linkages, such as olefins, is well known in the art and the subject of many publications and patents. Recently, interest has been expressed in certain normally solid amino-substituted alkanethiols, prepared for example by the reaction of hydrogen sulfide with amino-substituted olefins, such thiols having utility, for example, as anti-radiation drugs and anti-oxidants.

A problem of recovery has been encountered in the preparation of certain amino-substituted alkanethiols due to their relatively high melting points and relatively low boiling points. Several of these compounds decompose at there atmospheric boiling point, making it difficult to recover these compounds from their reaction mixtures. For example, 1-amino-2-propanethiol can be prepared by the reaction of hydrogen sulfide with allylamine. In this reaction, the yield of the desired amino-substituted alkanethiol is relatively low and considerable quantites of reaction mixture must be treated to recover the desired product. Since 1-amino-2-propanethiol decomposes at its atmospheric boiling point, 133° C., it becomes necessary to use vacuum distillation to recover this compound However, this compound melts at 65° C. and thus when vacuum distillation is utilized a material is distilled overhead at only 20 to 30° C. above the melting point of the compound. When this overhead material passes into the condenser, it cools and solidifies and plugs the condenser, and the distillation must be terminated.

Accordingly, an object of this invention is to provide an improved process for the recovery of amino-substituted alkanethiols from materials containing the same. Another object is to provide an improved process for the recovery of 1-amino-2-propanethiol from a reaction mixture containing the same. Another object is to purify amino-substituted alkanethiols. Further objects and advantages of this invention will become apparent to those skilled in the art from the following discussion and appended claims.

Briefly, I have discovered an improved process for the recovery of amino-substituted alkanethiols, such as 1-amino-2-propanethiol, from materials containing the same, such as their reaction mixture, which process comprises subjecting such material to distillation in the presence of an alkylbenzene or aliphatic alcohol having an atmospheric boiling point in the range of 120–155° C. The vaporous overhead from the distillation, comprising a mixture of the amino-substituted alkanethiol product and alkylbenzene or aliphatic alcohol, can be cooled and condensed, and the desired product separated from the total distillate by crystallization or the like.

The amino-substituted alkanethiols of particular concern in this invention are 1-amino-2-propanethiol (M.P. 65–67° C., B.P. 133° C. @ 760 mm. Hg) and 3-amino-propanethiol (M.P. 109–110° C., 152–153° C. @ 760 mm. Hg), which compounds are normally solid and can be prepared by the known reaction of hydrogen sulfide with allylamine. The reaction mixture formed by this reaction can be distilled with an alkylbenzene or an aliphatic alcohol according to this invention to recover the thiols from such reaction mixture. Free radical catalysts, such as peroxide compounds, organic azo compounds, and actinic radiation such as ultraviolet radiation, are sometimes employed in such reaction. Reaction promoters such as the organic tri-alkyl phosphites, e.g., trimethyl phosphite, can be used in carrying out the reaction. The allylamine can be used in the form of its hydrogen chloride salt, in which case the amino-substituted alkanethiol is produced in the form of such a salt, which can be converted to the corresponding free or non-salt compound, for example by adding a base such as sodium hydroxide to the reaction mixture before distilling the latter according to this invention. Another normally solid amino-substituted alkanethiol which can be recovered according to this invention is 2-aminoethanethiol (M.P. 90° C., B.P. 130° C. @ 760 mm. Hg) which can be prepared by the reaction of hydrogen sulfide with ethylenimine or the reaction of 2-chloroethylamine with sodium hydrosulfide.

It should be understood, however, that the subject invention is not to be limited to the recovery of the amino-substituted alkanethiols from their reaction mixtures, but rather can be employed to recover the alkanethiols from any materials containing the same.

The alkylbenzenes or aliphatic alcohols used in this invention are normally liquid and act as solvents for the amino-substituted alkanethiols. These solvents (or carriers, or diluents) will have atmospheric boiling points in the range of 120 to 155° C., and representatively include ethylbenzene, cumene, o-xylene, m-xylene, p-xylene, mixed xylenes, n-amyl alcohol, isoamyl alcohol, 2-hexyl alcohol, n-hexyl alcohol, and the like, including mixtures thereof. The amount of solvent employed can vary, but generally will be within the range of 50–150 weight percent of the material containing the compound of interest.

The distillation step of this invention is carried out under atmospheric pressure or subatmospheric pressure, for example 10–760 mm. Hg, the exact pressure to be used depending on the particular compound of interest. The distillation can be carried out without the attendant plugging difficulties encountered heretofore, and the compound of interest can be recovered in good yields without trouble by merely cooling the distillate to crystallize the amino-substituted alkanethiol, the crystals of which can be separated from the solvent by filtration or the like. Usually, it will be necessary to cool the distillate to fairly low temperatures to effect crystallization, generally to 0–40°. Any suitable distillation column or still having means to condense the overhead product can be used in carrying out this invention.

The objects and advantages of this invention are further illustrated in the accompanying drawing and examples, but it should be understood that the materials employed, reaction conditions, and other details shown in the drawing and recited in these examples should not be construed to unduly limit this invention.

*Example I*

A run was carried out in which 1-amino-2-propanethiol was prepared and an attempt made to recover the compound from its reaction mixture by distillation in absence of a diluent.

In this run, 684 grams of allylamine and 816 grams of hydrogen sulfide were charged to a 1-gallon, stirred, stainless steel autoclave, and the mixture was then heated to 85° C. for 6 hours. The reaction solution was discharged without cooling to yield 1100 grams of reaction solution. A portion of the reaction solution amounting to 350 grams was distilled at atmospheric pressure in an efficient distillation column to obtain in addition to unrecated hydrogen sulfide and allylamine, only 30.5 grams of 1-amino-2- propanethiol, boiling 129–133° C. This represents a yield of only 8.7 mol percent based on the allylamine charged to the initial reaction.

*Example II*

A run was carried out in which 1-amino-2-propanethiol was similarly prepared and recovered from its reaction mixture by distillation in the presence of a diluent according to the process of this invention.

In this run, 684 grams of allylamine and 816 grams of hydrogen sulfide were heated together for 5 hours at 85° C. as described in Example I. The reaction mixture was discharged hot to yield 1100 grams of reaction solution. The reaction solution was then diluted with 1100 grams of mixed xylenes to obtain two liquid phases. The two-phase mixture was then distilled in a Vigreaux column at aspirator pressure until about 500 ml. clear, viscous liquid came overhead and the kettle material became a single phase. The overhead was heated and distilled at atmospheric pressure to 75° C., and the remaining amount of kettle material was returned to the kettle of the original distillation column. The pressure was adjusted to 80 mm. mercury absolute, and distillation of the combined kettle products was continued until crystals began to form in the condenser. An additional 1,000 grams of mixed xylenes were added to the resulting kettle and the resulting mixture distilled again at 80 mm. mercury absolute pressure to yield 2328 grams overhead and 37.7 grams of kettle product. The total overhead from the distillation at 80 mm. Hg was cooled to −30° C. to crystallize the 1-amino-2-propanethiol. This material was filtered under nitrogen, and the cake was washed with n-pentane. The cake was then dried in a slow stream of nitrogen, yielding 254 grams of 1-amino-2-propanethiol. This represents 23.3 mol percent yield based on the allylamine initially charged to the reaction zone.

*Example III*

Another run was carried out by the method of Example II which demonstrates the effectiveness of the distillation process of this invention.

In this run, 684 grams of allylamine and 816 grams of hydrogen sulfide were heated at 85° C. for 24 hours to yield 1115 grams of reaction solution. The reaction solution was diluted with 600 ml. of mixed xylenes and distilled at atmospheric pressure until the pot temperature reached about 85° C. Liquid in the amount of 214 grams was obtained as overhead from this distillation, and the pot contents became a single phase. An additional 1500 grams of mixed xylenes were then added to the pot, and the pressure was then adjusted to 80 mm. mercury absolute pressure. The distillation was then continued until the pot temperature again reached 85° C. The pressure was then reduced to 40 mm. mercury to yield a small amount of additional material overhead when the kettle was heated to 85° C. During the distillation at the reduced pressures, 2560 grams of colorless liquid was collected in the receiver, and 173.9 grams liquid was collected in a Dry Ice-Acetone cooled trap. The 1-amino-2-propanethiol was recovered from the liquid in the receiver by crystallization as described in Example II. The yield was 257.8 grams of 1-amino-2-propanethiol, representing 23.6 mol percent yield based on allylamine initially charged to the reaction zone.

*Example IV*

A run was carried out in which $H_2S$ was reacted with allylamine hydrochloride in the presence of ultraviolet light to form 3-aminopropanethiol. This compound was then recovered by the process of this invention.

In this run, 855 grams of allylamine and 1500 grams of concentrated hydrochloric acid (35% by weight aqueous HCl) were reacted together to form allylamine hydrochloride. The resulting mixture was then evaporated to dryness, and the salt remaining was dissolved in 1500 grams of isopropyl alcohol. This solution along with 1020 grams of $H_2S$ and 50 cc. of trimethyl phosphite was charged to a 1.5 gallon reactor fitted with an ultraviolet light source. The ultraviolet lamp (450 watt) was turned on, and the reaction mixture was maintained at 12–17° C. for 2 hours under ultraviolet irradiation. The mixture was then heated in a steam bath to remove unreacted $H_2S$. The mixture was then treated with 630 grams of NaOH to convert the salt to the free base. To the resulting mixture was added 1 liter of xylene, after which the mixture was filtered under nitrogen. The filtrate was mixed with 1250 cc. of additional xylene, after which the mixture was subjected to distillation at atmospheric pressure. Unreacted allylamine and isopropanol were taken off overhead first, after which a large quantity of material was taken off overhead at 137–150° C. at atmospheric pressure. When this material was chilled in an ice bath, 494.2 grams of 3-aminopropanethiol was recovered. The crystals were washed with n-pentane and dried under nitrogen. This is a yield of 36.1% based on the allylamine.

Various modifications and alterations of this invention will become apparent to those skilled in the art from the foregoing discussion, and it should be understood that this invention is not to be limited unduly to that set forth herein for illustrative purposes.

I claim:

1. A process for recovering an amino-substituted alkanethiol selected from the group consisting of 1-amino-2-propanethiol, 3-aminopropanethiol, and 2-aminoethanethiol from a material containing the same, which process comprises mixing said material with a solvent selected from the group consisting of alkylbenzenes and aliphatic alcohols and having an atmospheric boiling point in the range of 120 to 155° C., subjecting the resulting mixture to distillation to obtain a distillate comprising said amino-substituted alkanethiol and said solvent, cooling said distillate to crystallize said amino-substituted alkanethiol, and separating the resulting crystals of said amino-substituted alkanethiol from the cooled distillate.

2. The process according to claim 1, wherein said material containing said amino-substituted alkanethiol is the reaction mixture formed by the reaction of hydrogen sulfide with allylamine.

3. The process according to claim 1, wherein said amino-substituted alkanethiol is 3-aminopropanethiol.

4. The process according to claim 1, wherein said amino-substituted alkanethiol is 1-amino-2-propanethiol.

5. The process according to claim 1, wherein said amino-substituted alkanethiol is 2-aminoethanethiol.

6. A process of recovering 1-amino-2-propanethiol from the reaction mixture formed by reacting hydrogen sulfide with allylamine, which process comprises mixing said reaction mixture with xylene, subjecting the resulting mixture to vacuum distillation to obtain an overhead comprising said 1-amino-2-propanethiol and xylene, condensing said overhead to form a liquid distillate, cooling said distillate to crystallize said 1-amino-2-propanethiol, and filtering the cooled distillate to separate the resulting crystals of said 1-amino-2-propanethiol.

References Cited in the file of this patent

UNITED STATES PATENTS

| | | |
|---|---|---|
| 2,231,241 | Bailey | Feb. 11, 1941 |
| 2,417,954 | Sloan | Mar. 25, 1947 |
| 2,766,236 | Harman | Oct. 9, 1956 |
| 2,766,303 | Bennett et al. | Oct. 9, 1956 |
| 2,835,704 | Walton | May 20, 1958 |
| 2,875,237 | Corcoran et al. | Feb. 24, 1959 |
| 3,070,579 | Lotz et al. | Dec. 25, 1962 |
| 3,072,542 | Johnson et al. | Jan. 8, 1963 |